United States Patent
Bennett et al.

(10) Patent No.: US 7,412,828 B1
(45) Date of Patent: Aug. 19, 2008

(54) ADJUSTABLE HYDRAULIC MOTOR APPARATUS

(75) Inventors: Michael L. Bennett, Sullivan, IL (US); Matthew C. Roney, Sullivan, IL (US); Thomas J. Langenfeld, Sullivan, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/854,843

(22) Filed: Sep. 13, 2007

Related U.S. Application Data

(63) Continuation of application No. 11/288,889, filed on Nov. 29, 2005, now Pat. No. 7,308,790, which is a continuation-in-part of application No. 11/237,055, filed on Sep. 28, 2005, now abandoned.

(60) Provisional application No. 60/614,767, filed on Sep. 30, 2004.

(51) Int. Cl.
*F16H 47/04* (2006.01)
*F16H 61/40* (2006.01)

(52) U.S. Cl. .......................... 60/487; 60/490
(58) Field of Classification Search ............ 60/487, 60/490, 492; 91/505; 475/83
See application file for complete search history.

(56) References Cited

U.S. PATENT DOCUMENTS

| | | | |
|---|---|---|---|
| 4,040,312 A | 8/1977 | Tappan et al. | |
| 5,000,667 A | 3/1991 | Taguchi et al. | |
| 5,560,277 A | 10/1996 | Nomura et al. | |
| 5,560,447 A | 10/1996 | Ishii et al. | |
| 5,836,160 A | 11/1998 | Chang | |
| 6,109,033 A | 8/2000 | Folsom et al. | |
| 6,151,895 A | 11/2000 | Matsura | |
| 6,174,139 B1 | 1/2001 | Stolzer | |
| 6,397,966 B1 | 6/2002 | Irikura et al. | |
| 6,524,206 B2 | 2/2003 | Tsunemi et al. | |
| 6,526,748 B1 * | 3/2003 | Trimble | 60/487 |
| 6,668,549 B2 | 12/2003 | Yano et al. | |
| 6,811,509 B1 | 11/2004 | Langenfeld et al. | |
| 6,811,510 B1 | 11/2004 | Langenfeld et al. | |
| 6,840,879 B1 | 1/2005 | Langenfeld et al. | |

FOREIGN PATENT DOCUMENTS

JP     05187515 A  *  7/1993

\* cited by examiner

*Primary Examiner*—Thomas E Lazo
(74) *Attorney, Agent, or Firm*—Neal Gerber Eisenberg LLP

(57) ABSTRACT

A hydraulic motor assembly having a hydraulic motor mounted in a motor housing and an axle mounted in a separate axle housing. A ring gear and a port block are mounted between the motor housing and the axle housing. A swash plate is mounted in the motor housing and is engaged to the hydraulic motor to control the hydraulic output thereof, and the swash plate is movable between at least a first position and a second position.

21 Claims, 23 Drawing Sheets

ADJUSTABLE HYDRAULIC MOTOR APPARATUS

CROSS-REFERENCE

This application is a continuation of U.S. application Ser. No. 11/288,889 filed Nov. 29, 2005, which is a continuation-in-part of U.S. application Ser. No. 11/237,055 filed Sep. 28, 2005 now abandoned, which claims priority from Provisional U.S. App. Ser. No. 60/614,767 filed Sep. 30, 2004. These prior applications are incorporated herein by reference in their entirety.

BACKGROUND OF THE INVENTION

This invention relates to adjustable hydraulic or hydrostatic motors for use in vehicles, industrial applications or other applications.

SUMMARY OF THE INVENTION

This invention discloses an adjustable hydraulic motor assembly having a housing in which the hydraulic motor, output axle and gear reduction set are mounted. The invention further provides an adjustment mechanism to permit the output of the hydraulic motor apparatus to be directly adjusted. With known hydraulic drive systems, the output of the system is generally changed through adjustment of the hydraulic pump, and the motor displacement remains fixed. This invention may be used in a variety of industrial and vehicle applications, especially those vehicles where a wheel motor is used.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
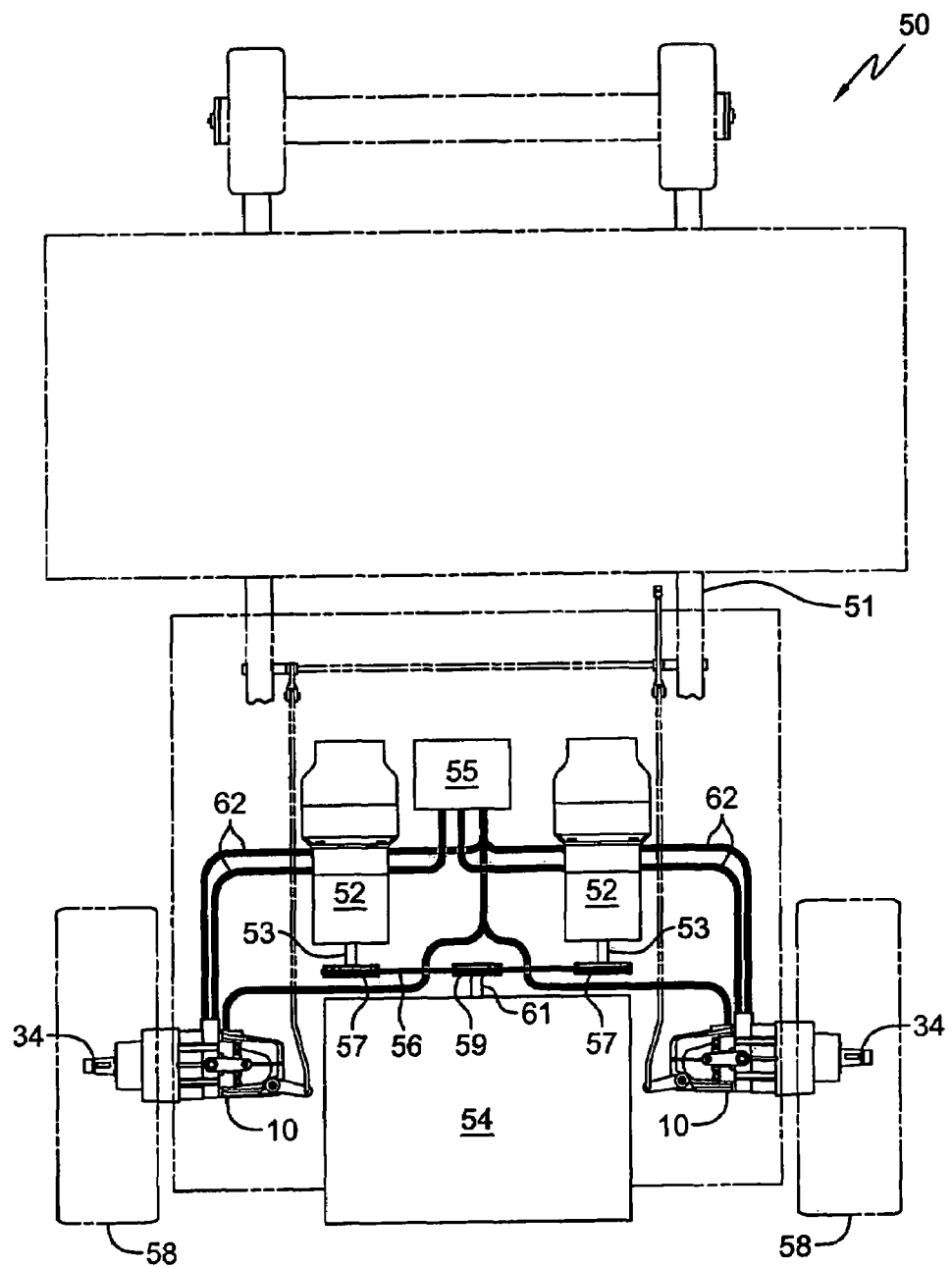
FIG. 1 is a top, partial schematic, plan view of an exemplary vehicle incorporating the present invention.

The vehicle 50 depicted schematically in FIG. 1 is a zero turn vehicle using two motor assemblies 10 as wheel motors to drive a pair of wheels 58. Vehicle 50 is powered by a prime mover such as engine 54, which drives pulley 59 through engine output shaft 61. A pair of pumps 52 is mounted on vehicle frame 51 in some known manner. Pump input shafts 53 are driven by pulleys 57 engaged to a belt 56 which is in turn driven by engine pulley 59. Pumps 52 are preferably of the axial piston design such as the Hydro-Gear BDP-10A, but other pump designs could also be used herewith. Hoses 62 are used to connect pumps 52 to ports 16a and 16b of motor assemblies 10. Reservoir 55 is also connected to pumps 52 through a plurality of hoses 62 in the manner shown. Other arrangements could be used depending on factors such as vehicle size, and the specific details of connections such as hoses 62 are not shown as this will be known to those of skill in the art.

As is known in the art during operation of vehicle 50, one of the hoses 62 connected between each pump and motor assembly will be under high pressure, and the other will be under low pressure or vacuum pressure, depending on the direction of actuation of pump 52. The actuation of pump 52 can be changed to modify the speed and direction of output axle 34. Each pump 52 can be separately controlled so that the two output axles 34 are independently controlled.

Figure 2:
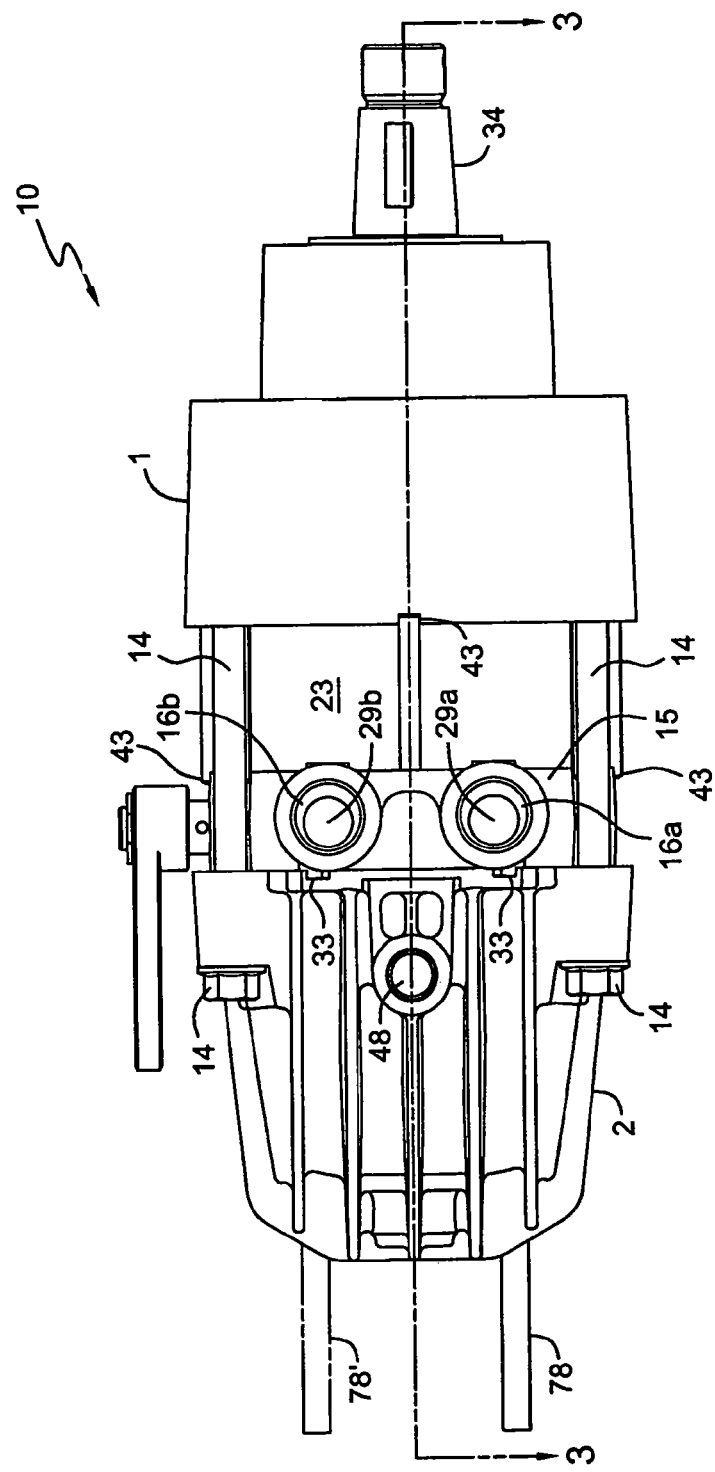
FIG. 2 is a plan view of one of the hydraulic motor assemblies shown in FIG. 1.
Figure 3:
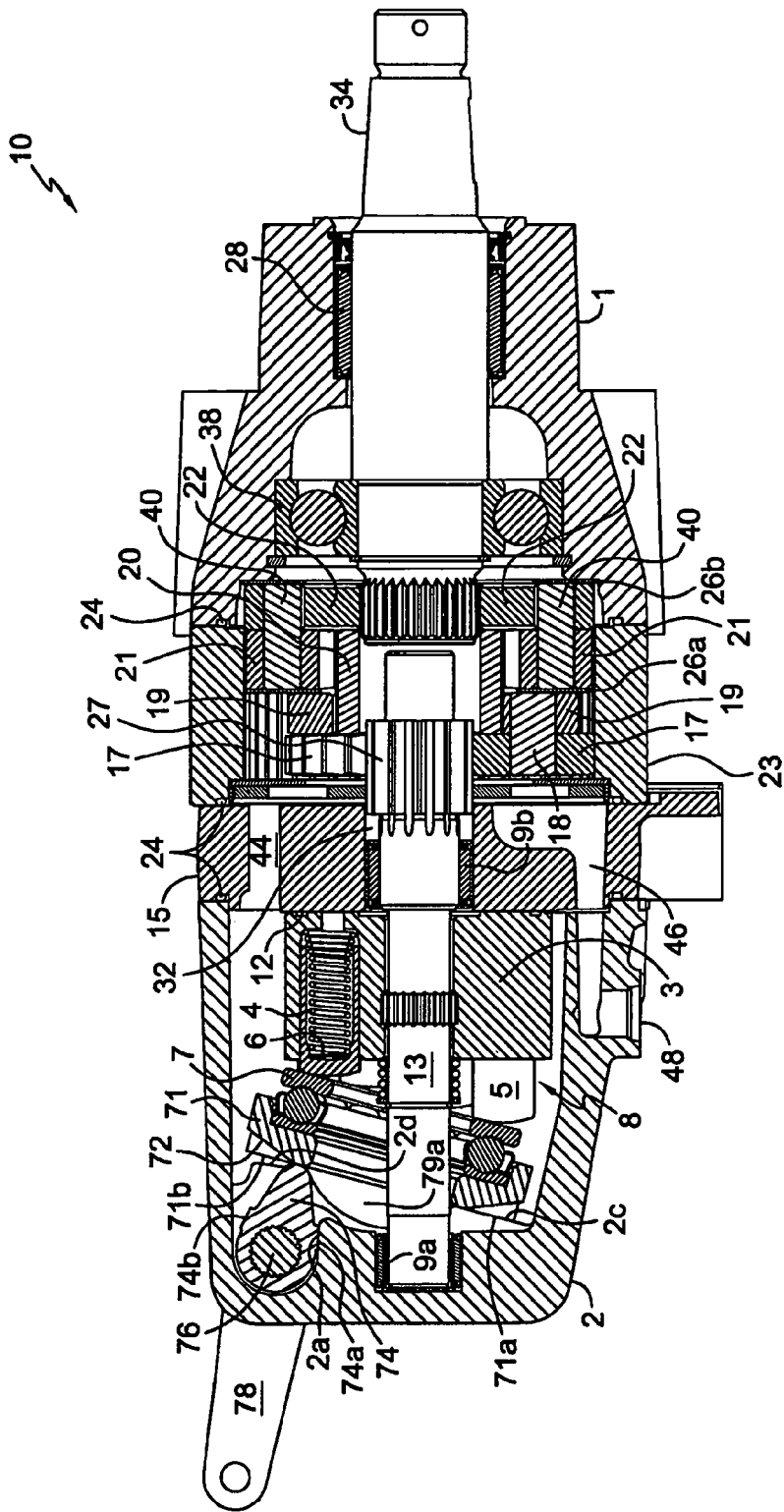
FIG. 3 is a cross-sectional side view of the hydraulic motor assembly shown in FIG. 2 along the lines 3-3 in FIG. 2, with the motor adjustment mechanism in a first position.
Figure 4:
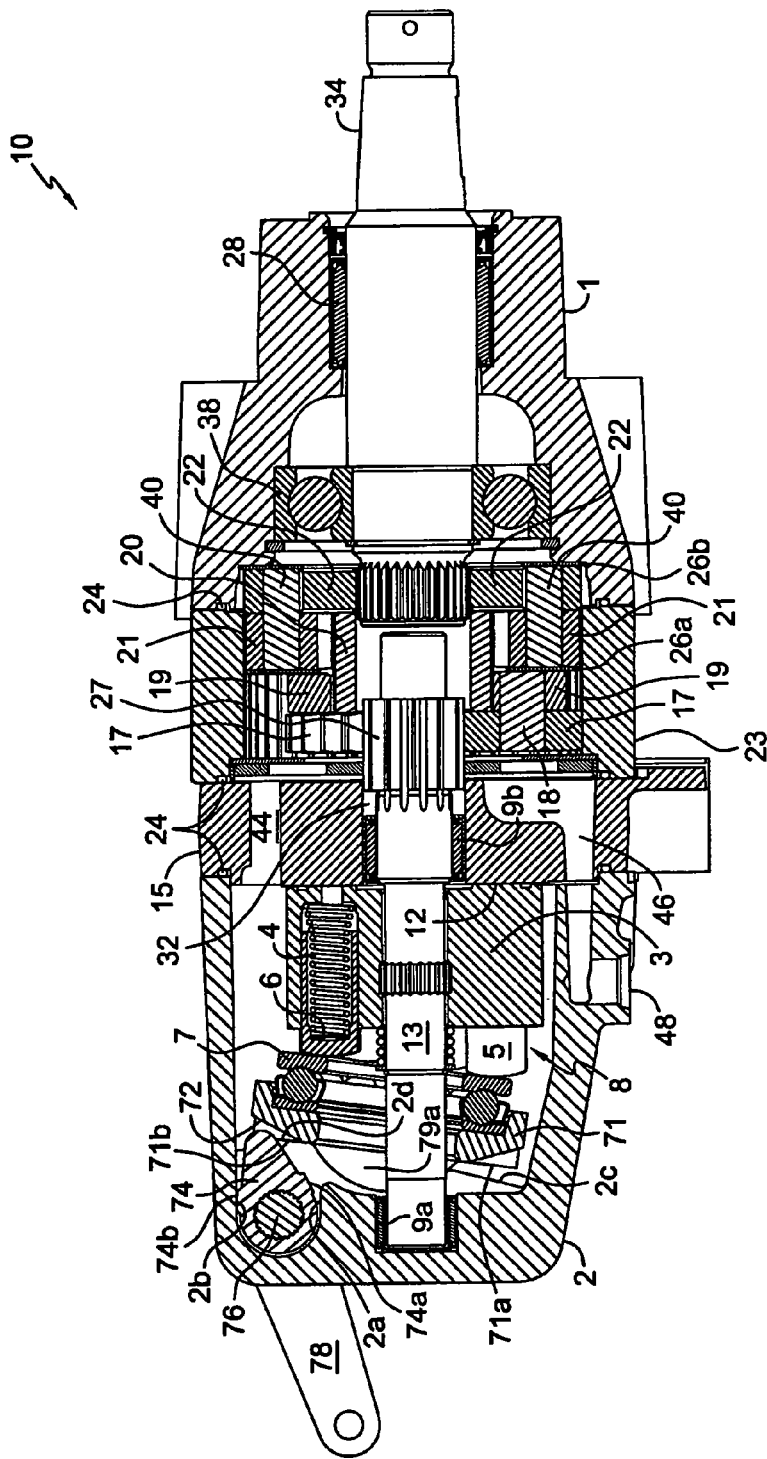
FIG. 4 is a cross-sectional side view similar to that of FIG. 3, with the motor adjustment mechanism in a second position.

FIGS. 2-4 depict exemplary motor assembly 10 of this invention, including a first embodiment of this invention. Motor assembly 10 is similar in structure to that disclosed in commonly owned application U.S. Pat. No. 6,811,509, the terms of which are incorporated by reference. The external casing or housing for assembly 10 comprises axle housing 1, motor housing 2 and the external surfaces of ring gear 23 and port block 15. A plurality of bolts 14 are used to secure axle housing 1 to motor housing 2, thus sandwiching the other elements between them. Port block 15, which may also be referred to as a port plate, may include a plurality of tabs 33 to aid in alignment and orientation with motor housing 2 during assembly. Ring gear 23 may also include a plurality of tabs 43 to aid in alignment of ring gear 23 with axle housing 1 and port block 15 during assembly.

An axial piston style hydrostatic motor 8 is located within motor housing 2 and on port block 15; motor 8 comprises a plurality of pistons 5 and corresponding springs 4 and thrust washers 6 mounted in rotatable cylinder block 3. Pistons 5 are of the spherically-shaped nose variety, and are often referred to as "bull-nosed pistons." Motor cylinder block 3 is rotatably mounted on a running surface 12 formed on port block 15 and drives motor output shaft 13. Bearings 9a and 9b, which are preferably needle bearings, are used to support motor shaft 13 within motor housing 2 and port block 15, respectively. Port block 15 includes at least two system ports 16a and 16b and an opening 32 to permit motor shaft 13 to pass there through. A pair of hydraulic passages 29a and 29b are formed in port block 15 to hydraulically connect motor cylinder block 3 with system ports 16a and 16b through kidney ports (not shown). As is known, the rotational speed and direction of motor shaft 13 will depend on the input to system ports 16a and 16b. Port block 15 is preferably made of cast iron, although other materials such as aluminum or the use of a separate valve plate would also be acceptable. It will be understood that in the context of this technology, the term "mounted on" does not necessarily mean secured or fixed thereto, as the cylinder block, for example, is not physically secured to the running surface.

It is understood that the shape of port block 15 is not essential, although there are benefits to the shape shown herein. This element can also be referred to as a center section, end cap, plate or the like. A first drain passage 44 permits hydraulic fluid to flow from inside motor housing 2 to ring gear 23 and the rest of the assembly. A second drain passage 46 is also formed in port block 15 and permits oil to drain from the system through case drain 48 formed in motor housing 2. Case drain 48 may be connected to reservoir 55 by way of hoses or the like.

Figure 5:
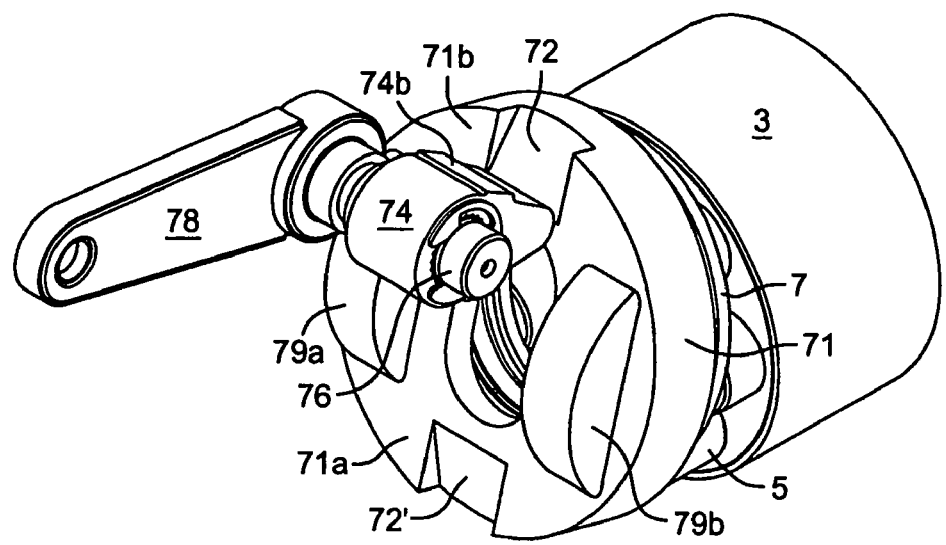
FIG. 5 is a perspective view of selected components of the assembly including the motor adjustment mechanism, with the adjustment mechanism shown in the first position.
Figure 6:
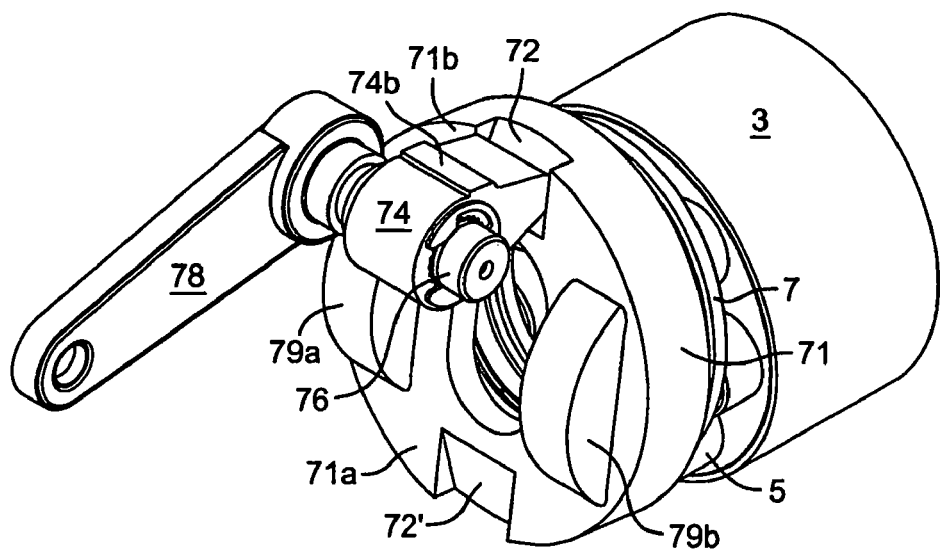
FIG. 6 is a perspective view of selected components of the assembly including the motor adjustment mechanism, with the adjustment mechanism shown in the second position.

Pistons 5 engage thrust bearing 7, which is supported in moveable swash plate 71. Swash plate 71 is moveable between a first position of 15 degrees off normal to the axis of motor shaft 13, such as is shown in FIGS. 3 and 5 and a second position of 7.5 degrees off normal, such as is shown in FIGS. 4 and 6. It will generally be understood that the first position corresponds to maximum hydraulic reduction, resulting in maximum torque output and minimum speed of the driven vehicle. The second position corresponds to a minimum hydraulic displacement and, therefore, lower torque output and correspondingly increased speed of the vehicle. This second position is often used to drive the vehicle from one operating location to another.

As shown most clearly in FIGS. 5 and 6, this embodiment of swash plate 71 is preferably symmetric about a central plane and has ramp 72 which engages actuator 74. Actuator 74 is moveable between the first position shown in FIG. 5 and the second position shown in FIG. 6 through rotation of toothed shaft 76 and control arm 78. A pair of support members 79a and 79b are formed on swash plate 71 to contact a corresponding portion of housing 2 to permit rotation of swash plate 71.

The benefit of using a symmetrical swash plate 71 is that it reduces the possibility of assembly errors and offers the user options in assembling the motor unit. For example, support members 79a and 79b may be inserted into housing 2 in two orientations 180° apart, but because of the symmetric nature of swash plate 71, both orientations are operationally equal. Thus, alternative ramp 72' would be used as the contact point for actuator 74. Also, with a simple change in the machining of housing 2, control arm 78 could be moved to the other side of actuator 74, and be in the alternative position of control arm 78' as shown in outline in FIG. 2. These options give the user the ability to change the external configuration of assembly 10 at a minimum cost to fit the unit to different applications.

Actuator 74 preferably has a pair of stops 74a and 74b formed thereon. Stop 74a is not shown in FIG. 5 but would preferably be of the same construction as stop 74b. Swash plate 71 also has a pair of stops 71a and 71b formed thereon. As seen in FIGS. 3 and 5, stop 71a contacts internal surface 2c of housing 2 to prevent the further movement of swash plate 71 when moved by actuator 74, and stop 74a may contact a first internal surface 2a of housing 2 when actuator 74 is in the first position to prevent further movement of actuator 74 if the tolerances of stop 71a and surface 2c are such that they permit stop 74a to contact first internal surface 2c. When actuator 74 is in the second position as shown in FIGS. 4 and 6, stop 74b contacts internal wall 2b of housing 2 to restrict further movement of actuator 74 while stop 71b contacts internal surface 2d of housing 2 to prevent further movement of swash plate 71. Stops 2a and 2b are thus seen to limit the motion of actuator 74, which otherwise might cause over-stroking of swash plate 71 or may become misaligned with swash plate 71, impairing the function of motor assembly 10. Stops 2c and 2d provide specific angles of operation for swash plate 71, thus defining two specific fluid displacements for axial piston motor 8. Note that as shown in FIG. 4, when actuator 74 is rotated to stop 2b, actuator 74 has been removed from contact with swash plate 71, thus allowing swash plate 71 to be fully supported by housing 2 through the force exerted thereon from piston springs 4.

Figure 24:
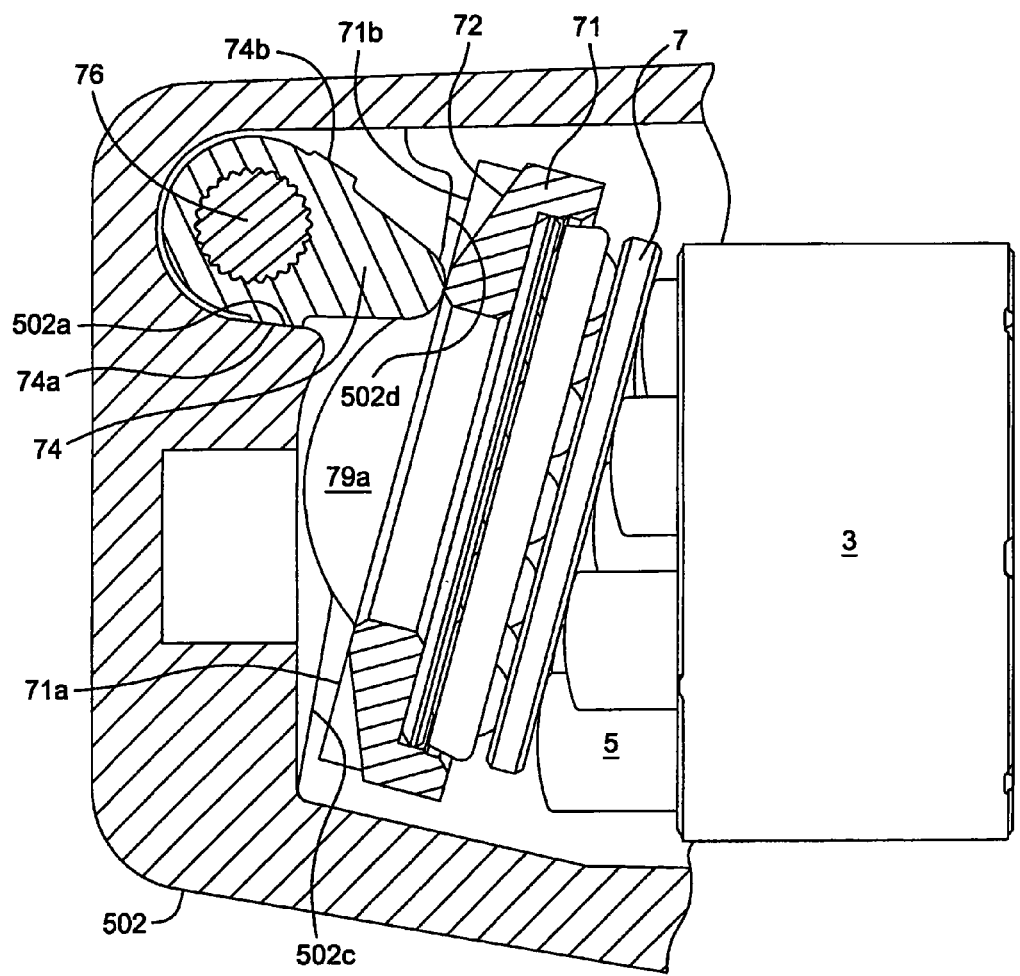
FIG. 24 is a partial cross-sectional side view of an eighth embodiment of this invention, similar to the view shown in FIG. 3, with the motor adjustment mechanism in a first position.

An alternative embodiment of this arrangement is shown in FIG. 24, which is similar in many respects to the embodiments previously discussed and in particular is similar to the embodiment of FIG. 3. It has been determined that it is preferred that stops 71a and 71b not actually contact internal surfaces 502c and 502d, respectively. Instead, actuator 74 is in an over-center relationship with swash plate 71 to maintain actuator 74 in the first position. Alternatively, an external linkage (not shown) may maintain actuator 74 in this position, which defines a first fluid displacement for axial piston motor 8. The embodiment in FIG. 24 shows the separation between the inner housing surfaces 502c and 502d from the corresponding stops 71a and 71b; this contact is still permissible if needed to prevent over stroking of the unit. The view of FIG. 24 has been simplified with certain elements removed for clarity.

The embodiments depicted herein use a dual planetary reduction system, although it will be understood that other gear reduction systems could be used in the spirit of the invention. Carrier pins 18 are mounted in primary planet carrier 19, and planet gears 17 are mounted on their respective pins 18. As is known in the art, washers 26a and 26b and O-rings 24 are used as needed; FIG. 3 depicts various other retaining rings, springs and the like that would be typical in such an assembly.

Motor shaft 13 has a gear form 27 integrally formed thereon; it will be understood that this gear form 27 could also be a separate gear fixed to shaft 13. Gear form 27 engages and drives primary planet gears 17, which in turn cause rotation of carrier 19. Sun gear 20 is engaged to the inner teeth of carrier 19 and transfers the rotational force through to secondary planet gears 21, which in turn are mounted on pins 40 mounted on secondary carrier 22.

As noted above, ring gear 23 also functions as part of the overall external housing for motor assembly 10 and provides an internal running surface for primary planet gears 17 and secondary planet gears 21. Port block 15 can also serve as part of the external housing, as port block 15 and ring gear 23 are sandwiched between axle housing 1 and motor housing 2. This arrangement, while not necessary to use the invention, reduces the amount of materials needed and the overall costs of the unit. The size of axle housing 1 and/or motor housing 2 could be increased to mount these elements internally.

Axle shaft 34 is supported in axle housing 1 by means of a needle bearing 28 and ball bearing 38 and is drivingly mated to secondary planet carrier 22. Thus, the rotational torque of motor shaft 13 is increased through the two sets of planetary gears 17 and 21.

In certain applications, it may be desired to include a means for causing the adjustable swash plate to return to the second displacement position such as is shown in FIGS. 4 and 6 after it is actuated to the first displacement position shown in FIGS. 3 and 5. Such means are depicted in the alternative embodiments shown in FIGS. 7 to 15. It will be understood that other elements of the motor assemblies depicted in FIGS. 7 to 15 can be identical to those previously discussed and these elements are not shown for the sake of clarity.

Figure 7:
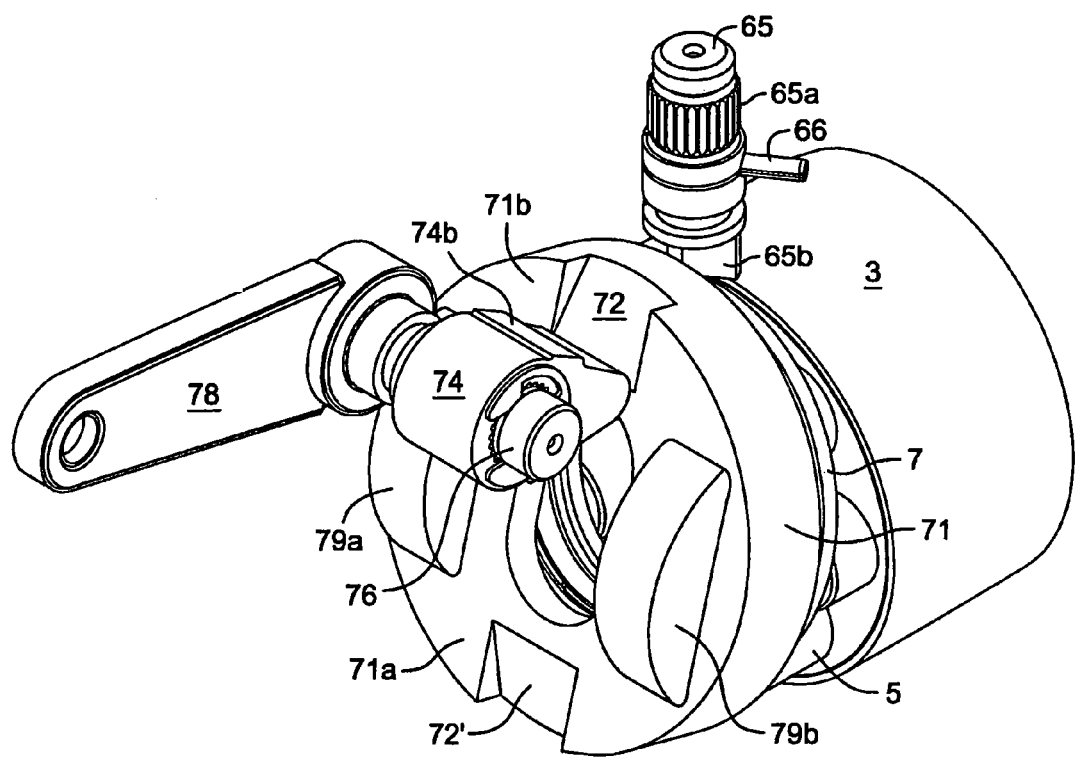
FIG. 7 is a perspective view of certain components of a hydraulic motor assembly in accordance with a second embodiment of this invention.
Figure 8:
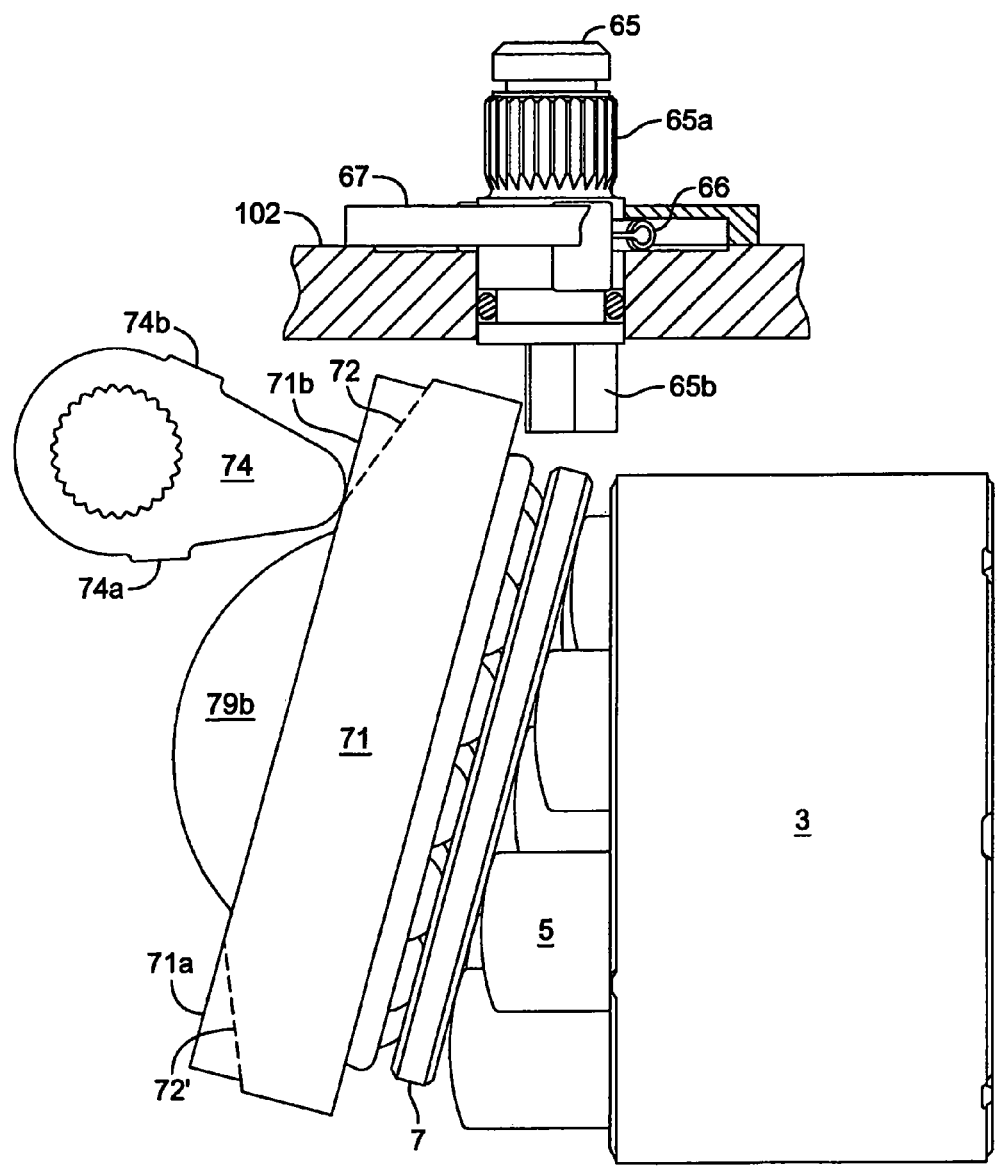
FIG. 8 is a partially cross-sectioned side view of the components of the hydraulic motor assembly of FIG. 7, with the swash plate actuator in the activated position.
Figure 9:
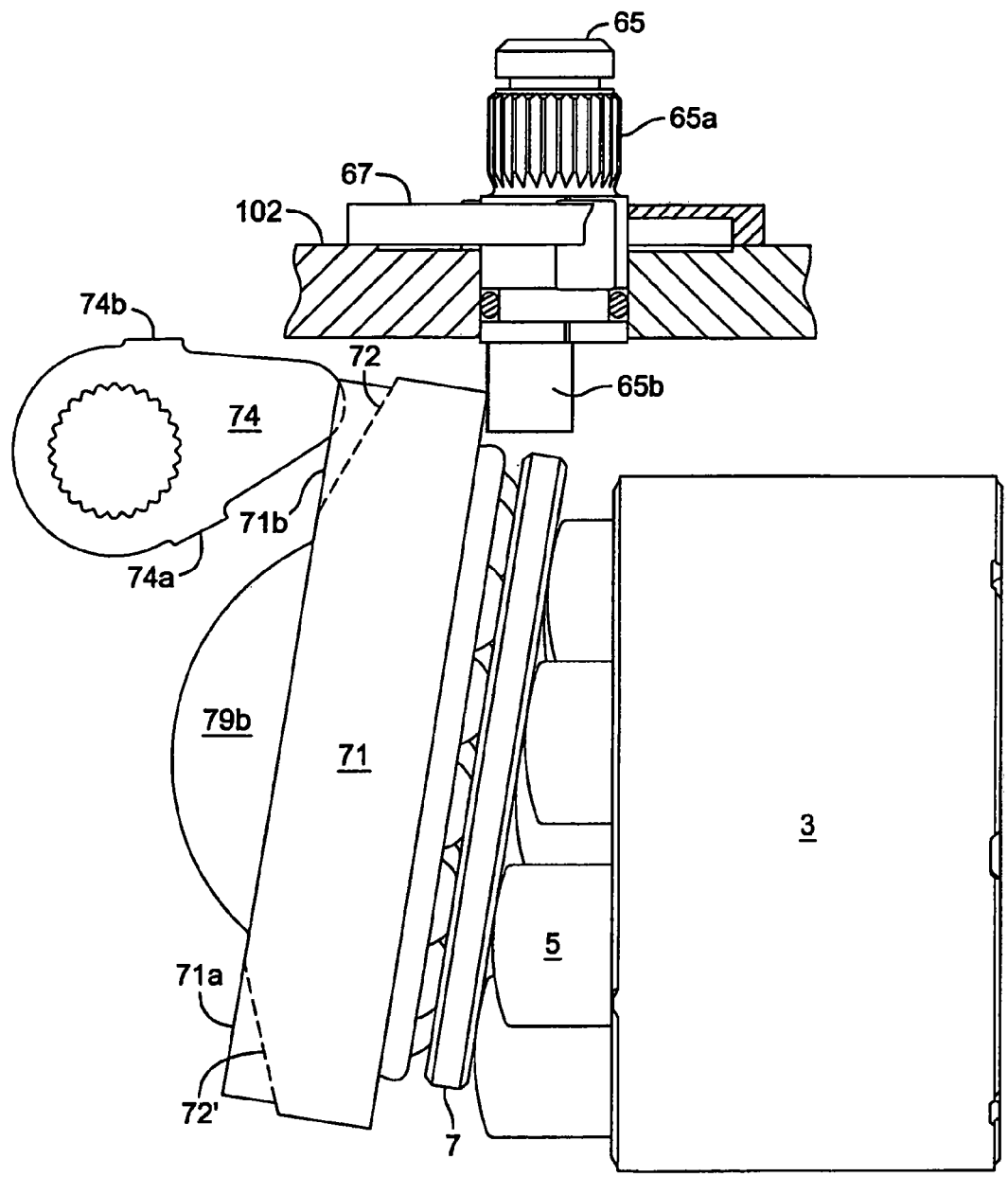
FIG. 9 is a view similar to FIG. 8, with the swash plate actuator in the deactivated position.

FIGS. 7-9 depict a first alternative embodiment, where only a portion of motor housing 102 is depicted (in FIG. 8) along with swash plate 71, cylinder block 3 and motor pistons 5. Motor housing 102 includes an opening to permit rotatable cam shaft 65 to extend therethrough. Toothed portion 65a is located outside housing 102 and may be attached to a control arm or similar mechanism and cam portion 65b is located inside housing 102 and engages a surface of swash plate 71.

A stop member 66 may be attached to cam shaft 65 to limit its rotation. Cover 67 is located on the exterior surface of housing 102 and provides the stop to limit the range of motion of stop member 66.

In FIG. 8, actuator 74 is in the activated position, and swash plate 71 is correspondingly in the high, or first displacement position. As actuator 74 is moved to the deactivated position as shown in FIG. 9, cam shaft 65 may also be rotated to its activated position such that cam member 65b rotates and contacts swash plate 71 to assist in moving swash plate 71 to the second displacement position.

It will be understood that this embodiment requires multiple control mechanisms, including one for actuator 74 (such as control arm 78 discussed previously) and one for cam shaft 65. This adds a level of complexity that may not be desired. A further alternative embodiment depicted in FIGS. 10-13 also provides a means by which the swash plate may be returned to the lower position without the need for a separate control mechanism.

In this embodiment, swash plate 171 is not symmetric but rather includes support members 179 that have been moved off center, which changes the actuating moment of swash plate 171. Note that while support member 179b has been depicted in what may be described as a half teardrop shape, the actual shape is not critical except that support member 179 and housing 2 should have similar radii at their contact point. Swash plate 171 includes an opening 171a for the motor shaft to extend through and an extended portion 171b. Actuator shaft 182 has a proximal end including a grooved or toothed portion 182a that will extend outside the motor housing, not shown in this view, to engage a control arm (not shown) and a distal end including a pointed portion 182b. The shape of pointed portion 182b is preferable to aid in the installation of O-rings (not shown) on actuator shaft 182 and to aid in installing actuator shaft 182 during assembly. If, for assembly reasons, actuator 182 needs to be installed after housing components are attached to each other, point portion 182b aids in lifting swash plate 171 to permit actuator shaft 182 to be installed.

Figure 10:
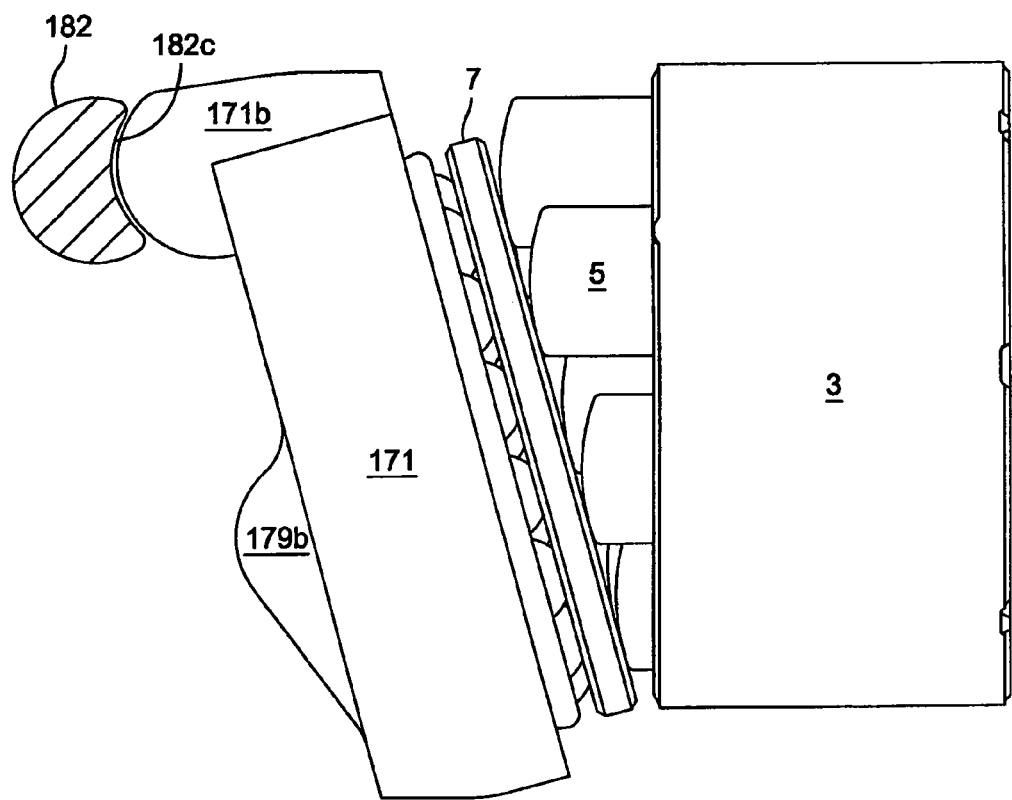
FIG. 10 is a partially cross-sectioned side view of certain components of a hydraulic motor assembly in accordance with a third embodiment of this invention.
Figure 11:
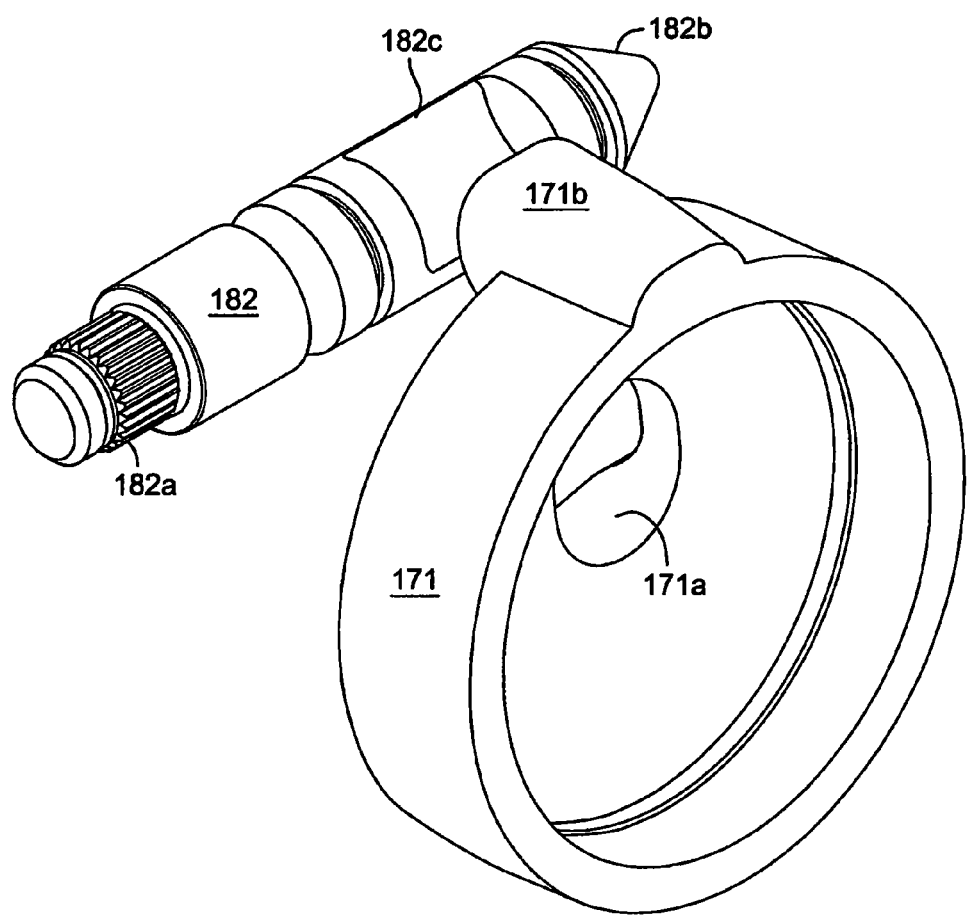
FIG. 11 is a perspective view of the swash plate and actuator shaft of the third embodiment depicted in FIG. 10.
Figure 12:
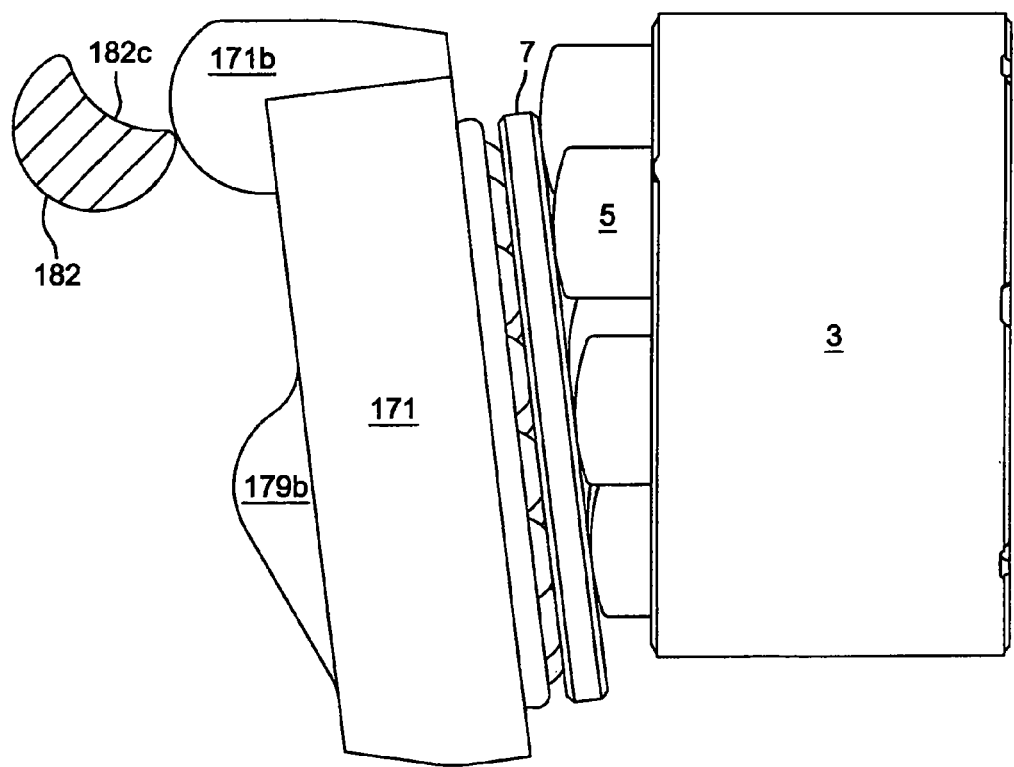
FIG. 12 is a partially cross-sectioned view of the components of the hydraulic motor assembly of FIG. 10, with the actuator shaft in the activated position.
Figure 13:
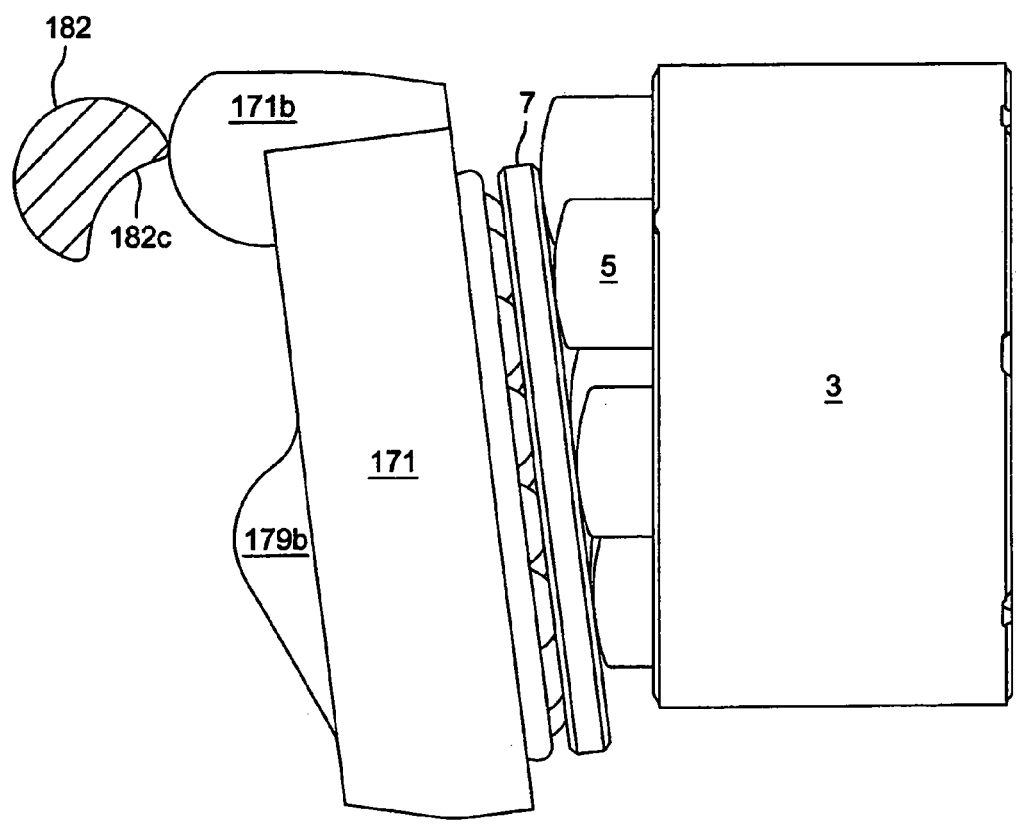
FIG. 13 is a view similar to FIG. 12, showing the actuator shaft being rotated in the opposite direction.

The upper exterior surface of extended swash plate portion 171b is shaped to cooperate with curved cam surface 182c of actuator shaft 182. Curved cam surface 182c acts to move swash plate 171 from the deactivated position, as shown in FIG. 10, to the activated position shown in FIGS. 11 and 12. While actuator shaft 182 is depicted as being rotated counter-clockwise in FIGS. 11 and 12 to activate swash plate 171, its symmetric shape about its axis of rotation means that it can also activate swash plate 171 through clockwise rotation, as shown in FIG. 13. Regardless of the direction of such rotation, the force of pistons 5 against swash plate 171 through thrust bearing 7 causes swash plate 171 to be biased to the deactivated position. Thus, the user will preferably restrain actuator shaft 182 in the activated position; this can be accomplished in a number of known manners involving the control linkages (not shown). The gap between extended swash plate portion 171b and curved surfaced 182 when actuator shaft 182 is in the deactivated position, as shown in FIG. 10, permits swash plate 171 to be fully supported by the housing. This may be preferred because the angular orientation of swash plate 171 may be better defined by interfacing with an interior housing surface (not shown) as opposed to the stackup of tolerances involved in interfacing surface 182c with extended swash plate portion 171b.

Figure 14:
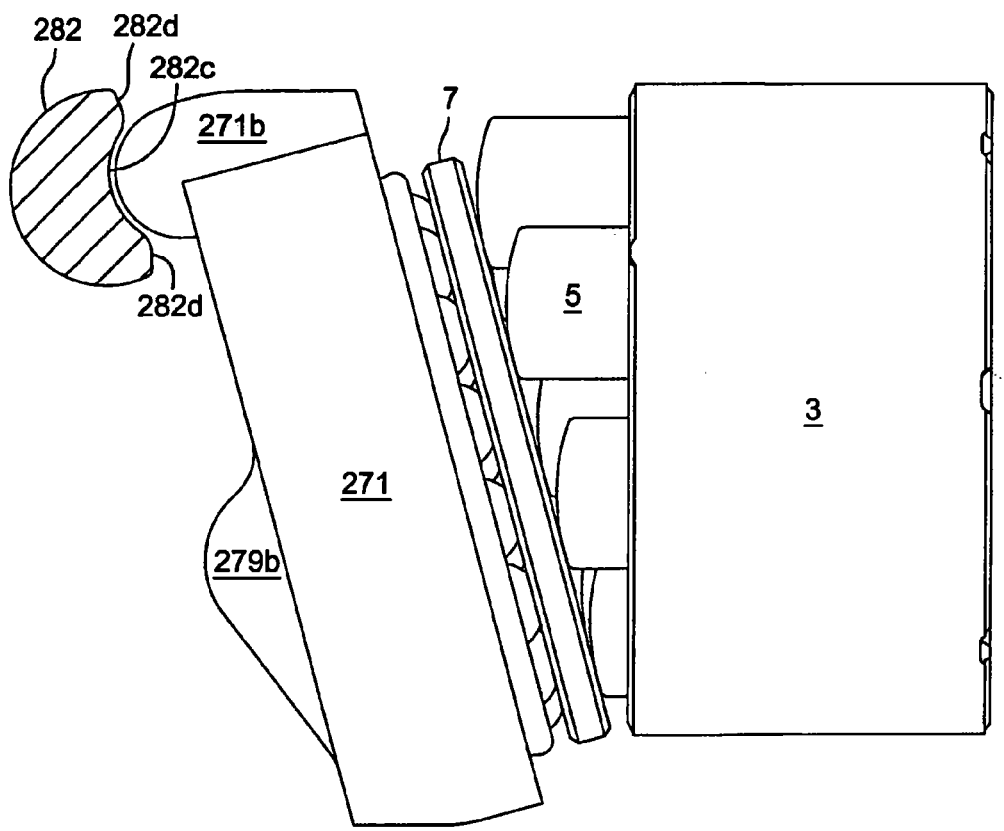
FIG. 14 is a view similar to FIG. 10 showing a fourth embodiment of this invention.
Figure 15:
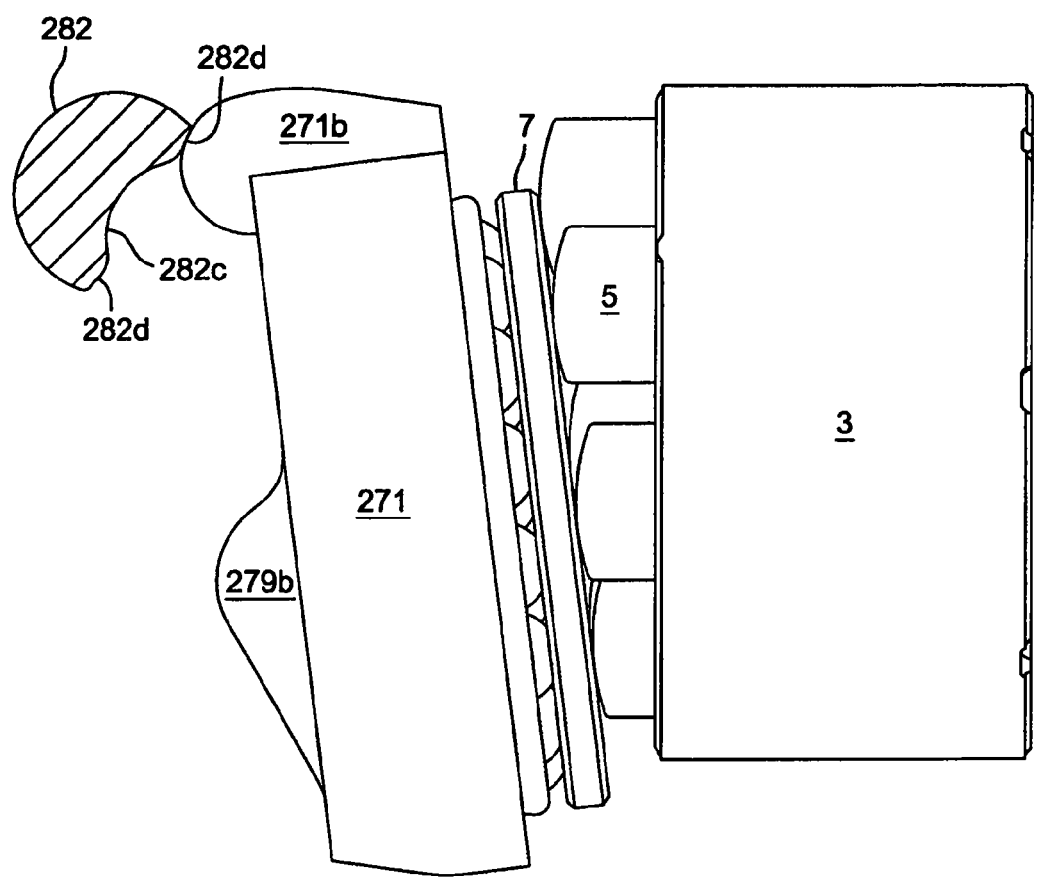
FIG. 15 is a view similar to FIG. 14, showing the actuator shaft in the activated position.

A further alternative embodiment is shown in FIGS. 14 and 15, where swash plate 271 is generally similar to the previously described swash plate 171, with the exception being the smaller radius of extended portion 271b. Actuator shaft 282 is similar to previously described actuator shaft 182 except that curved cam portion 282c has a somewhat smaller radius to match the smaller curvature of extended portion 271b and portions 282d on either end. Portions 282b have a slight curvature to match the curvature of extended portion 271b. When actuator shaft 282 is rotated to activate swash plate 271, the contact of portions 282d and extended portion 271b maximizes the contact area and minimizes the point contact so as to minimize wear on these components. Portions 282d also aid in maintaining the position of swash plate 271 by providing resistance to the movement of extended portion 271b toward curved cam surface 282c.

Figure 16:
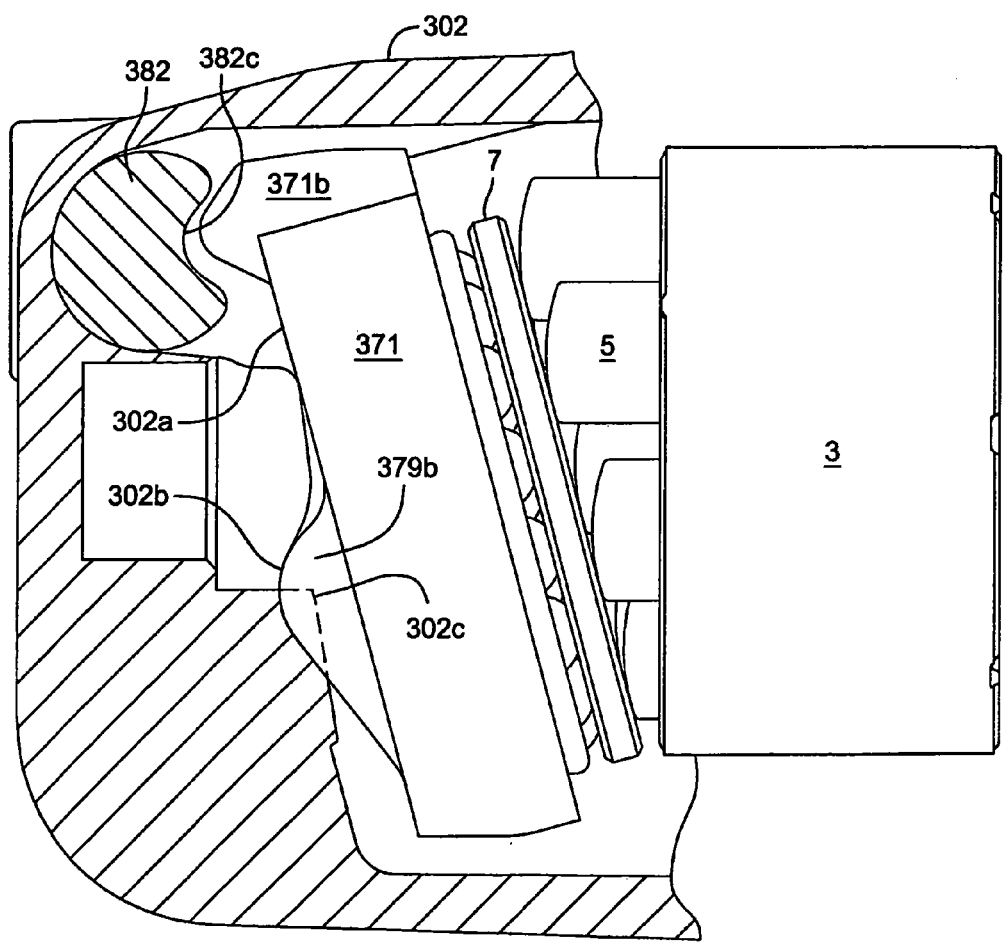
FIG. 16 is a partially cross-sectioned side view of certain components of a hydraulic motor assembly in accordance with a fifth embodiment of this invention.
Figure 17:
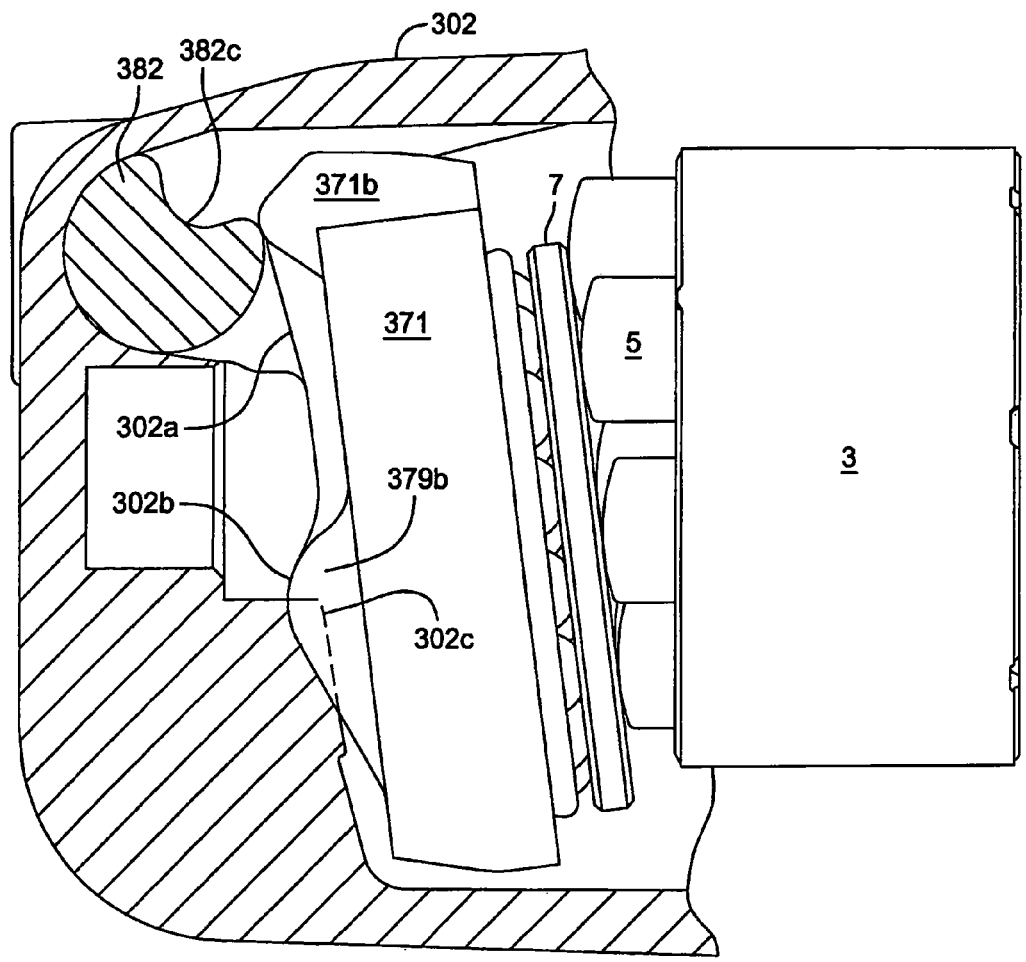
FIG. 17 is a view similar to FIG. 16, with the actuator shaft in the activated position.
Figure 18:
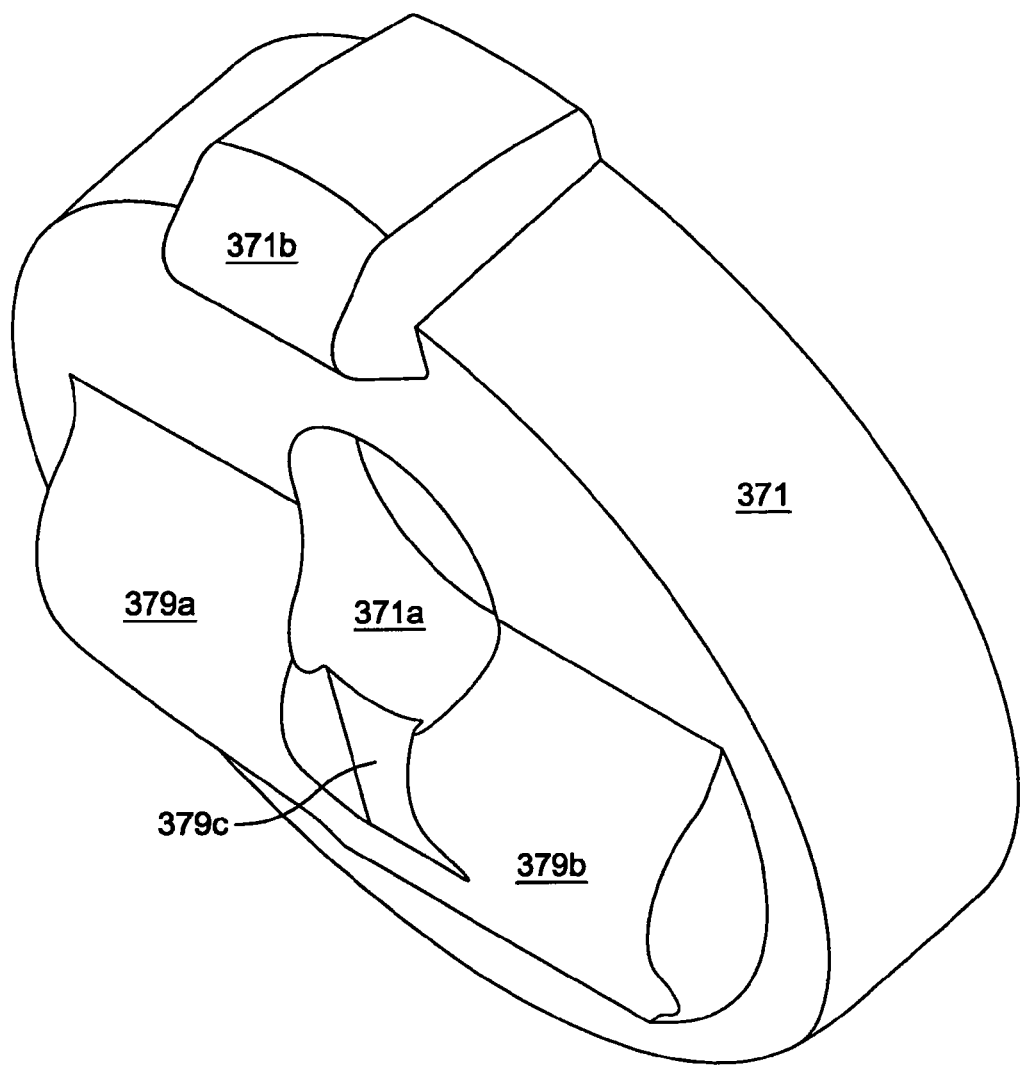
FIG. 18 is a perspective view of the swash plate shown in FIGS. 16 and 17.

A fifth embodiment of the invention is shown in FIGS. 16-18, where swash plate 371 is generally similar to previously described swash plates 171 and 271, with the most significant difference being in the configuration of extended portion 371b. In FIGS. 16 and 17, a portion of housing 302 is depicted, along with internal surfaces 302a, 302b and 302c, which are shaped to engage or support swash plate 371 in manners described herein.

Actuator shaft 382 is similar to actuator shaft 182 but the radius in curved cam portion 382c is smaller, and the gap or space between extended portion 371b and curved cam portion 382c is larger, than in the previously described embodiments. The increased gap allows for greater tolerance variations in the various components so that when actuator shaft 382 is in the position shown in FIG. 16, swash plate 371 will be fully supported on surface 302a of housing 302. In FIG. 17 actuator shaft 382 has been rotated to engage extended portion 371b and thereby move swash plate 371 away from housing surface 302a. Movement of swash plate 371 occurs at the interface between support members 379a and 379b and mating surface 302b of housing 302.

As shown in FIG. 18, swash plate 371 also includes an indentation 379c between support members 379a and 379b to interface with housing portion 302c to aid in maintaining the position of swash plate 371 along the direction of support members 379a and 379b.

Figure 19:
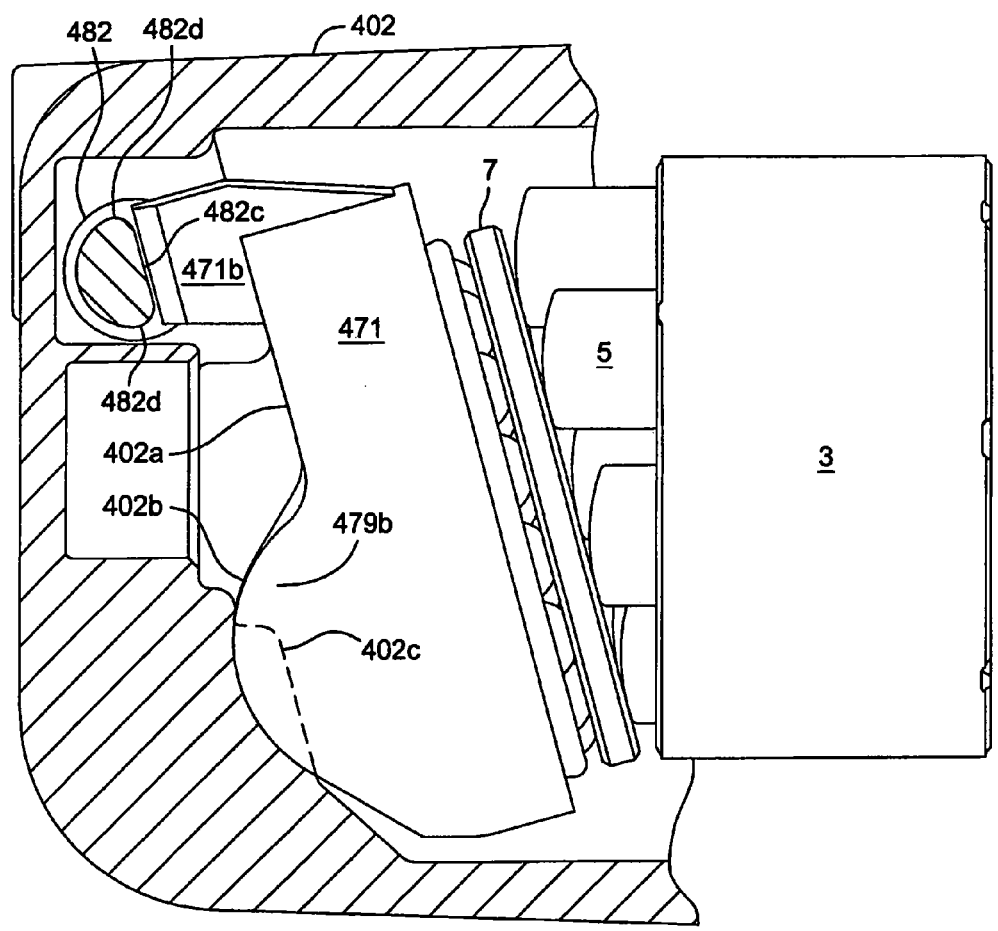
FIG. 19 is a partially cross-sectioned side view of certain components of a hydraulic motor assembly in accordance with a sixth embodiment of this invention.
Figure 20:
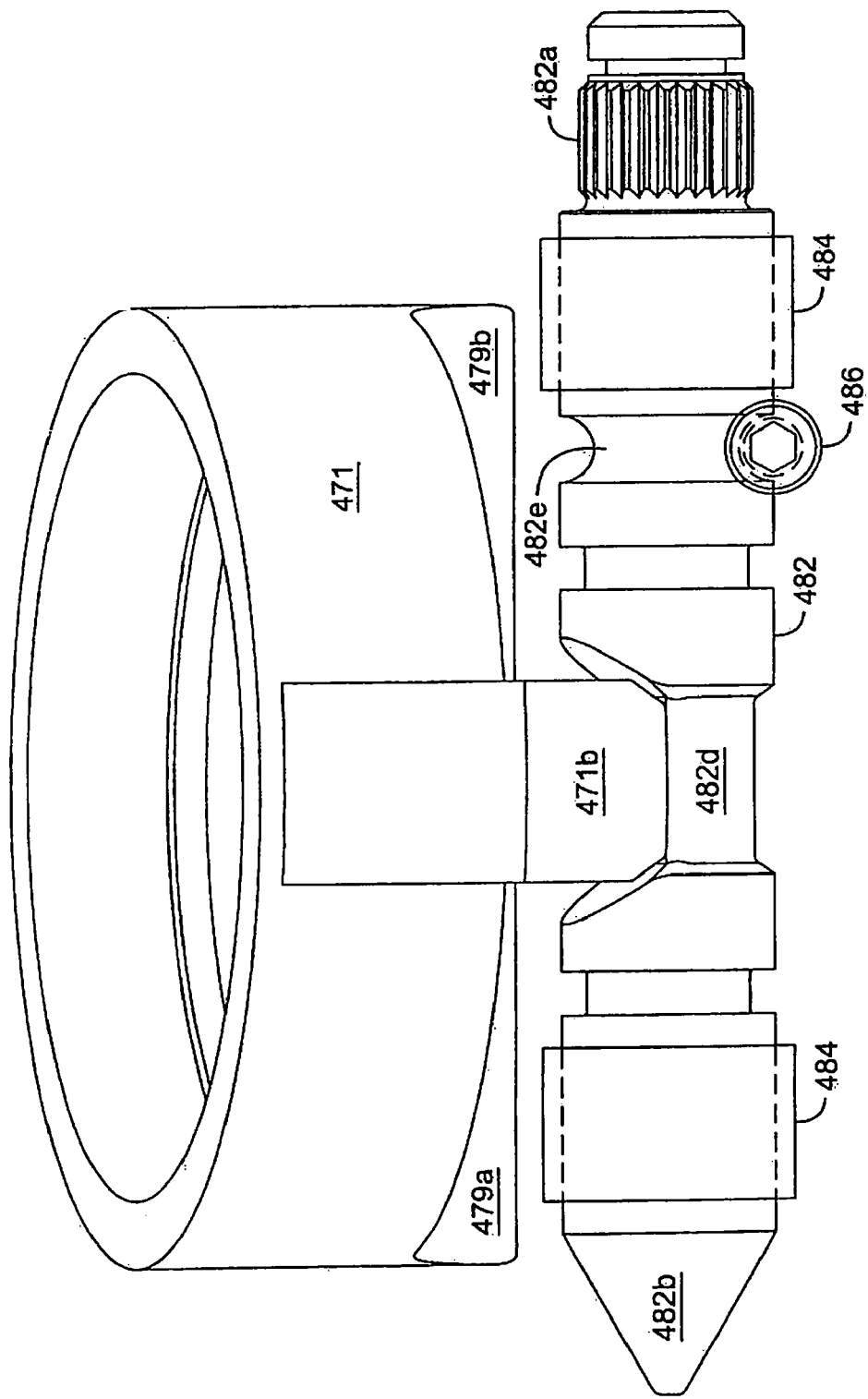
FIG. 20 is an end view of the swash plate, actuator and other select components of the sixth embodiment.
Figure 21:
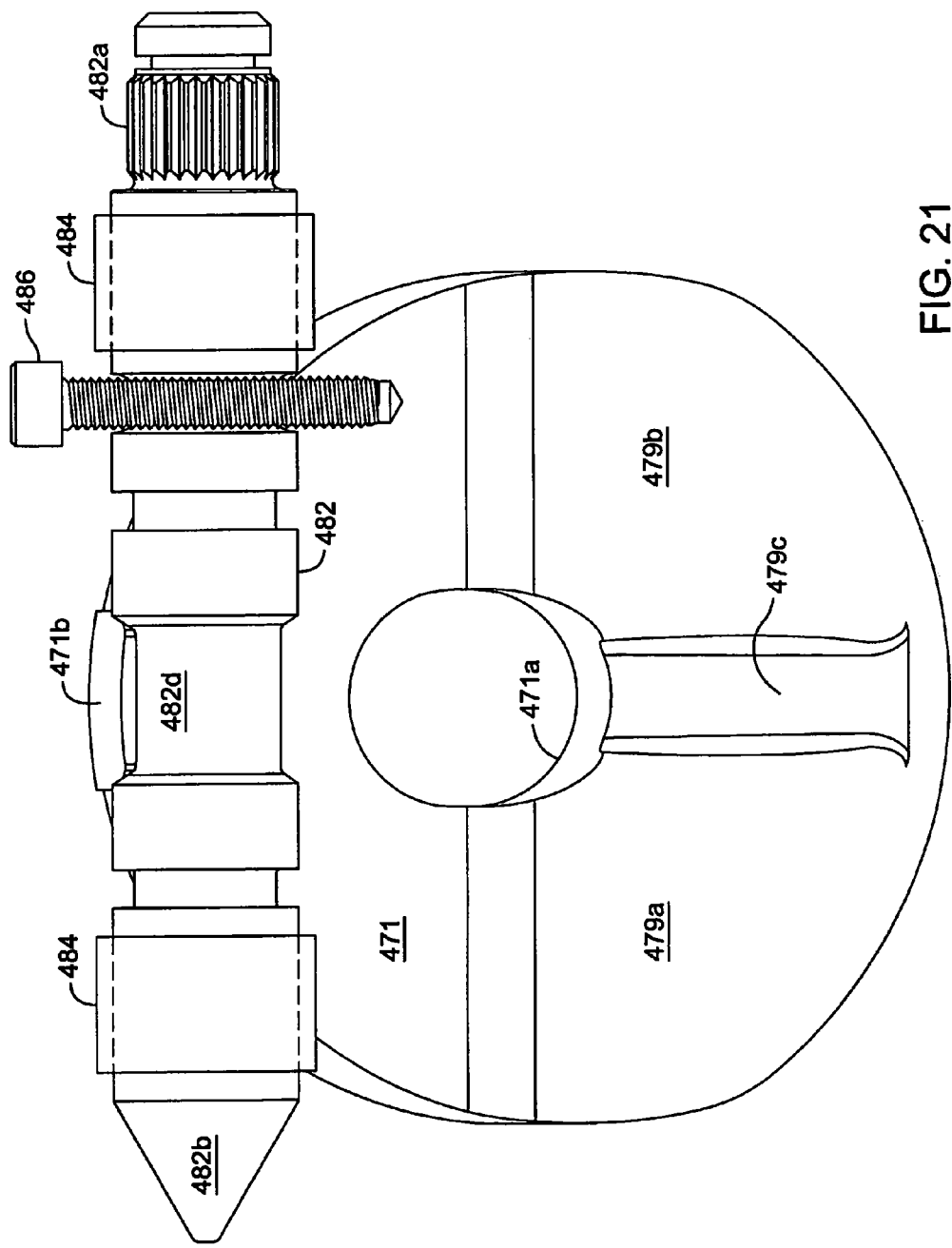
FIG. 21 is a plan view of the components of the sixth embodiment shown in FIG. 20.

A sixth embodiment of the invention is shown in FIGS. 19-21. The contact of swash plate 471 with surface 402a of housing 402, as shown in FIG. 19, is permitted by the disengagement of actuator 482 from extended portion 471b and the subsequent gap between these two features. Movement of swash plate 471 is accomplished by rotation of actuator shaft 482 and the subsequent engagement of curved surface 482d with extended portion 471b. Swash plate 471 would then rotate at the interface between support portions 479a and 479b and mating surface 402b of housing 402. Similar to the previous embodiment, housing portion 402c engages in indentation 479c of swash plate 479 to help maintain the position of swash plate 479 along the direction of support surfaces 479a and 479b.

As can be seen best in FIGS. 20 and 21, actuator 482 is supported in housing 402 by bushings 484. Once actuator 482 has been inserted into housing 402, fastener 486 may be inserted into housing 402 to engage groove 482e and thus retain actuator 482 in housing 402. Groove 482e is located outside the sump area of the housing so that fastener 486 need not be sealed where it penetrates housing 402.

Actuator 482 also features a splined portion 482a to interface with an operating arm (not shown), though other interface configurations are known in the art and any suitable configuration is acceptable.

Figure 22:
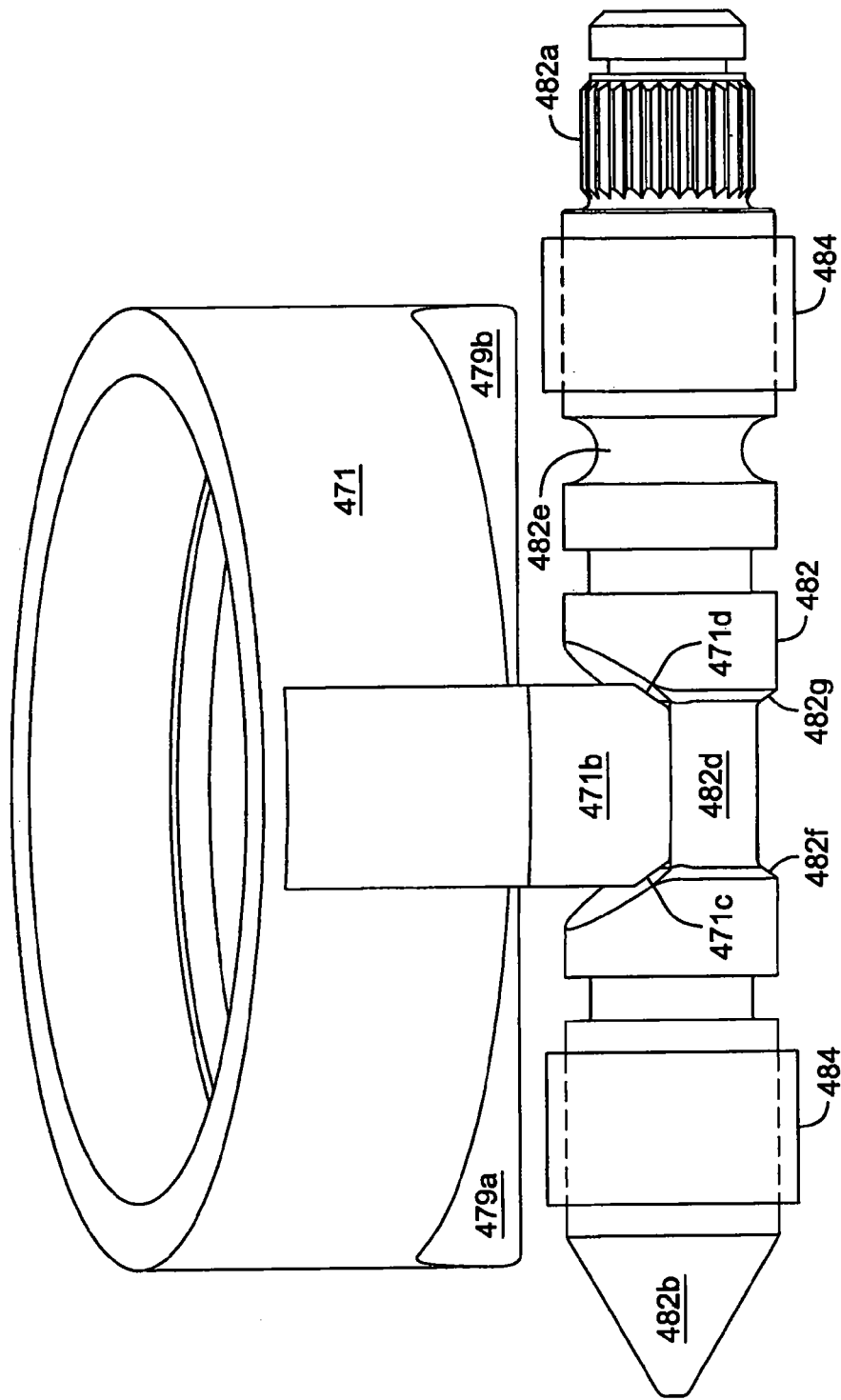
FIG. 22 is an end view of the swash plate, actuator and other select components of a seventh embodiment of this invention, similar to the view of FIG. 20.
Figure 23:
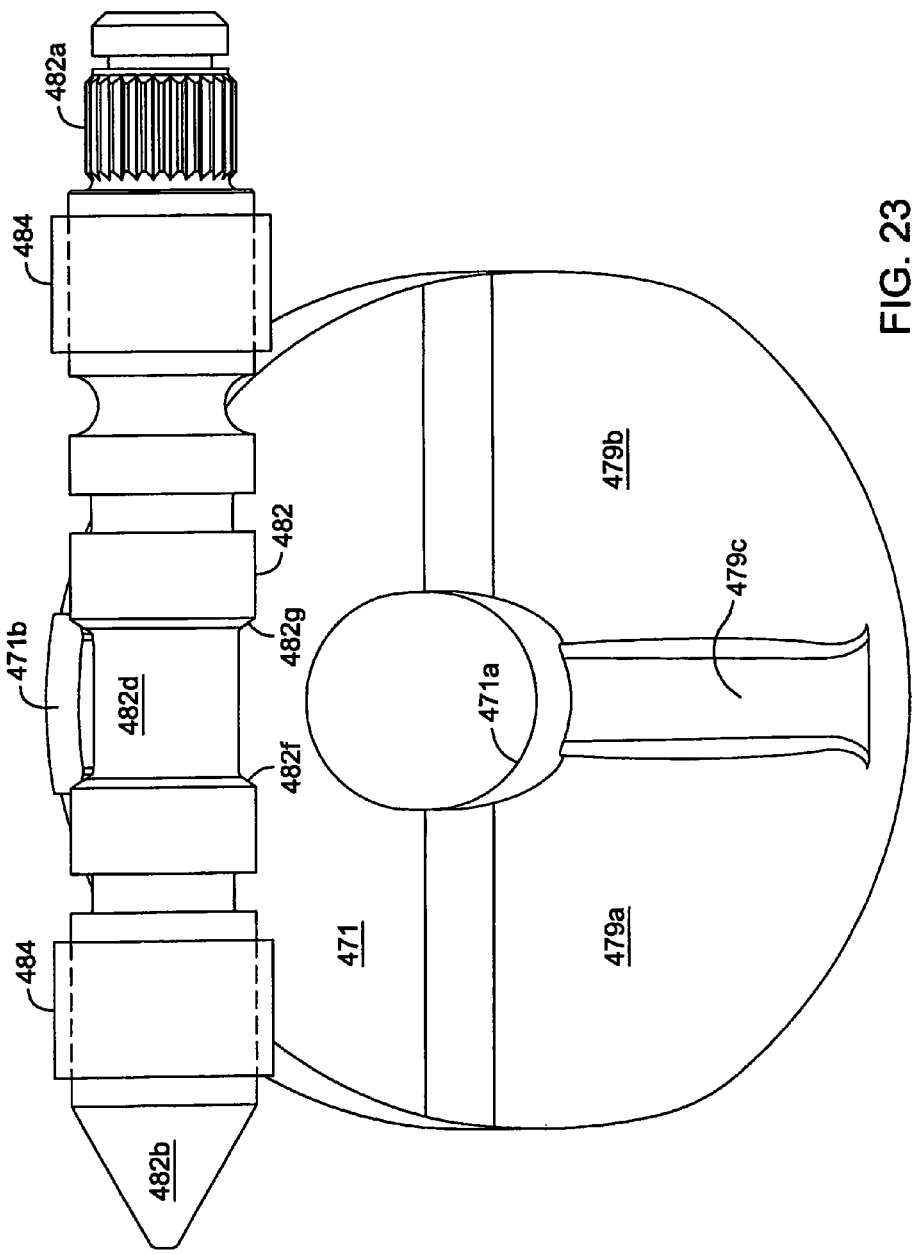
FIG. 23 is a plan view of the components of the seventh embodiment of this invention, similar to the view of FIG. 21.

A further embodiment is shown in FIGS. 22 and 23; these views are substantially identical to those shown in FIGS. 20 and 21, but demonstrate that fastener 486 may be eliminated, and actuator 482 may be retained by surfaces 482f and 482g engaging surfaces 471c and 471d respectively. The retention force may be changed by altering the angle of contact, thus changing the effect of the down force from springs 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A hydraulic drive device comprising:
    a hydraulic motor assembly fluidly connected to a hydraulic pump assembly spaced apart from the hydraulic motor assembly, wherein the hydraulic motor assembly comprises a motor housing, a rotatable motor cylinder block disposed in the motor housing, a plurality of axial motor pistons disposed in the motor cylinder block and a motor shaft engaged to and driven by the motor cylinder block and supported by the motor housing;
    a gear reduction assembly for reducing the speed of the output of the hydraulic motor assembly;
    an axle shaft driven by the gear reduction assembly, wherein the axle shaft extends from the hydraulic motor assembly and is coaxial with the motor shaft; and
    a swash plate removably supportable by the motor housing in either a first position or alternatively in a second position rotated 180 degrees about the motor shaft from the first position, the swash plate engaging the motor pistons in either the first or second position.

2. The hydraulic drive device of claim 1, further comprising a port block located between the hydraulic motor assembly and the gear reduction assembly, the port block comprising a pair of ports opening on an outer surface of the hydraulic motor assembly for providing at least one portion of the fluid connection between the hydraulic pump assembly and the hydraulic motor assembly.

3. The hydraulic drive device of claim 1, further comprising a pair of ramps formed symmetrically and opposite to each other on the swash plate.

4. The hydraulic drive device of claim 1, further comprising at least one stop formed on the swash plate, wherein the at least one stop engages an interior surface of the motor housing at a first location to limit the range of motion of the swash plate in a first direction.

5. The hydraulic drive device of claim 1, wherein the swash plate is movable about an axis perpendicular to the motor shaft.

6. The hydraulic drive device of claim 5, further comprising an actuator extending into the motor housing to change the position of the swash plate.

7. The hydraulic drive device of claim 6, wherein the actuator rotates about an axis perpendicular to the motor shaft and the axis does not intersect with the motor shaft.

8. The hydraulic drive device of claim 6, further comprising a second actuator extending into the housing to engage and move the swash plate.

9. The hydraulic drive device of claim 6, wherein the motor housing and swash plate are adapted to permit the actuator to be mounted in either a first location or a second location within the housing.

10. A hydraulic motor assembly fluidly connected to a hydraulic pump assembly spaced apart from the hydraulic motor assembly, the hydraulic motor assembly comprising:
    a motor housing and a separate axle housing;
    a hydraulic motor cylinder block supported in the motor housing and having a plurality of axial motor pistons disposed therein;
    a port block having a pair of openings that open external to the hydraulic motor assembly, wherein the pair of openings provide at least a portion of the fluid connection between the hydraulic motor assembly and the hydraulic pump assembly;
    a gear reduction assembly comprising a ring gear having an external surface and an internal, toothed surface;
    a motor shaft driven by the hydraulic motor cylinder block and supported at least partially by the motor housing and extending through the port block to engage the gear reduction assembly;
    an axle shaft driven by the gear reduction assembly and extending from the axle housing, wherein the axle shaft is coaxial with the motor shaft; and
    a swash plate removably supported by the motor housing, wherein the swash plate is symmetric such that it is capable of being supported in a first position or alternatively in a second position rotated 180 degrees about the motor shaft from the first position, and the swash plate engages the motor pistons in either the first or second position.

11. The hydraulic motor assembly of claim 10, wherein the axle housing is located directly adjacent to the ring gear.

12. The hydraulic motor assembly of claim 11, wherein the porting block is located directly adjacent to the ring gear.

13. The hydraulic motor assembly of claim 11, wherein the motor shaft extends into a volume defined by the internal portion of the ring gear.

14. The hydraulic motor assembly of claim 10, wherein the swash plate comprises a pair of ramps symmetrically disposed on opposite sides of the swash plate.

15. The hydraulic motor assembly of claim 10, further comprising an actuator extending into the motor housing to change the position of the swash plate.

16. A hydraulic motor assembly comprising:
   a hydraulic motor disposed within a motor housing, the motor comprising a plurality of axially movable pistons disposed in a rotatable cylinder block;
   a motor shaft driven by the motor cylinder block;
   an actuation mechanism supported and extending into one side of the housing; and
   a swash plate removably supported in the housing, wherein the swash plate is symmetric such that it may alternatively be located in the housing in a first position or a second position rotated 180 degrees about the motor shaft from the first position, and the swash plate is engaged to the motor pistons and the actuation mechanism in either the first or second position.

17. The hydraulic motor assembly of claim 16, further comprising a pair of ramps formed symmetrically and opposite to each other on the swash plate.

18. The hydraulic motor assembly of claim 16, wherein the actuation mechanism comprises an actuator directly engageable with the swash plate, and at least one stop formed on the actuator to engage an interior surface of the housing at a first location to limit the range of motion of the actuator in a first direction.

19. The hydraulic motor assembly of claim 18, further comprising a second stop formed on the actuator, wherein the second stop engages an interior surface of the housing at a second location to limit the range of motion of the actuator in a second direction.

20. The hydraulic motor assembly of claim 16, wherein the actuation mechanism further comprises an actuator engageable with the swash plate, a first stop formed on the swash plate and a second stop formed on the actuator, wherein the first stop engages an interior surface of the housing at a first location and the second stop engages an interior surface of the housing at a second location.

21. The hydraulic motor assembly of claim 16, wherein the actuation mechanism rotates about an axis perpendicular to the motor shaft and said axis does not intersect the motor shaft.

\* \* \* \* \*